Patented Dec. 27, 1949

2,492,790

UNITED STATES PATENT OFFICE 2,492,790

ACID RESISTING CEMENT AND METHOD OF MAKING

Ladislaw Vilmos Farkas, Jerusalem, Palestine, and Michael Mojzesz Szwarc, Prestwich, Manchester, England, assignors of one-half to Ellis-Foster Company, Montclair, N. J., a corporation of New Jersey No Drawing. Application April 30, 1947, Serial No. 745,100. In Great Britain June 10, 1946

5 Claims. (Cl. 106—74)

This invention relates to acid resisting cements, and has for its object the production of acid resisting cements which will have a sufficiently slow set to enable proper working of the cement into proper position, will then set within a reasonable period (e. g. an hour) to a fairly hard condition, and which will then continue to further harden for a considerable period, and which will resist the action of acids (in the concentrated or diluted state) for a very long time whether hot or cold.

Cements used for laying up acid-resisting bricks, tiles, blocks or other shapes (e. g. in Glover towers, acid storage tanks, vessels in which strong acids act upon minerals, etc.) and cements used for lining such equipment, must be capable of resisting action of acids for a long period.

Heretofore cements made by mixing an inert filler or aggregate (e. g. finely crushed quartz, quartz sand, etc.) with a solution of an alkali metal silicate (e. g. water glass) have been used for such purposes.

For accelerating the setting of such cements, it was proposed in British Patent 551,408, to add to such cements an alkyl ester of a fatty acid. However since such esters are not readily soluble in water to any considerable extent, it is difficult to thoroughly mix the ester with the aggregate and silicate solution in a homogeneous manner.

In accordance with our present invention we employ esters of polyhydric alcohols, preferably still containing at least one OH group, which esters are miscible with water and with the silicate solution. This easily gives homogeneous mixtures, which are certain in their action. Esters of glycerin with one or with two fatty acid radicals, esters of glycol with one fatty acid radical or mixtures of these, etc., are suitable, these having the desired solubility and the desired slow rate of action.

Among the esters of polyhydric alcohols tested, glycerol diacetate (the so-called "diacetin" of commercial grade) was found to be especially suitable, and mixtures of this with some glycerol monoacetate. The former is miscible with water in all proportions, and it is readily possible to mix this homogeneously with a mixture of finely crushed quartz and sodium silicate, very quickly. This ester has a slow neutralizing effect on the alkali in the sodium silicate solution. It appears that the ester hydrolyzes in the presence of the water of the sodium silicate solution, and the fatty acid reacts with the soda of the silicate, liberating $SiO_2$ from the silicate which bonds the filler (quartz) particles together.

The following examples are given, for illustration, but the invention is not limited to the details of these examples.

*Example 1.*—2 kgs. of quartz sand, crushed to all pass a 150-mesh screen, is mixed with 1 liter of waterglass (sodium silicate solution of 1.35 s. g., i. e. 33% concentration, having a $Na_2O:SiO_2$ ratio of about 2.7). With this is homogeneously mixed 350 grs. of glycerol diacetate. This gave a mortar-like mixture which could be spread in place, and the setting of this mixture begins after 15–20 minutes. The mass became stone-like in character after about an hour.

A part of this mortar-like mass was shaped into discs of 30–35 mm. diameter and 14–17 mm. thickness (under hand pressure with a trowel), and then allowed to harden and set, for the purpose of testing. Some of these discs were tested and found to withstand boiling in 10% hydrochloric acid, 25% sulfuric acid, 80% sulfuric acid, and 10% nitric acid, for 18 days, without deterioration. The loss in weight in the discs, so tested, was small.

Some of the discs (without any acid treatment) were tested for tensile strength. Tests on discs 1 day old showed a tensile strength of about 70 lbs. per sq. inch, and discs 30 days old showed a tensile strength of 550 lbs. per sq. inch.

In other tests, we used quartz crushed to all pass 200-mesh, mixtures of quartz with talc, or with barium sulfate, talc alone, all with satisfactory results.

*Example 2.*—A waterglass solution of commercial grade, containing 180 g. NaOH and 320 g. $SiO_2$ per kg. was used, in an experiment similar to Example 1. The products produced were less satisfactory. It was apparent that the waterglass was too concentrated to mix easily and homogeneously with the diacetin.

*Example 3.*—The waterglass of Example 2 was mixed with sufficient water to contain 180 grams of NaOH and 320 gr. $SiO_2$ per liter. 200 gr. of finely crushed quartz, all passing a 200 mesh screen, 100 cc. of this diluted waterglass and 36 grams (30 cc.) of diacetin were homogeneously mixed, and some of this made into molded discs as above. Some of this was made into briquets of 8-shape, for tensile strength tests, the minimum cross section of these being 5 sq. cm. The unmolded mixture began to set in about 10 minutes, and became stone-like in about an hour. It will be seen that in this example, the amount of the diacetin would, by hydrolysis, give enough acetic acid to neutralize (react with) about 85% of the soda in the water glass used. But we do not restrict the invention to this exact figure. We prefer to use amounts of the esters in which the acid radical is equivalent to about 80 to 90% of the alkali in the water glass.

The products so made were tested in various ways. Before testing the resistance to acids, the discs were immersed in the respective acids for 12 hours, at about 100° C., then washed in distilled water, dried and weighed. This final weight was considered as the dry weight of the disc. The tests on loss of weight when treated with these different acid solutions is given in the following table.

Table 1
Temperature 100°–105° C.]

|  | Loss in g. per 100 g. sample immersed in— | | | |
|---|---|---|---|---|
|  | 10% HCl | 10% HNO$_3$ | 25% H$_2$SO$_4$ | 80% H$_2$SO$_4$ |
| 0—2nd day | 4.20 | 2.50 | 3.60 | 3.00 |
| 2—4th day | 0.40 | 0.40 | 0.40 | 0.90 |
| 4—6th day | 0.50 | 0.30 | 0.30 | 0.35 |
| 6—8th day | 0.20 | 0.30 | 0.20 | 0.30 |
| 8—10th day | 0.05 | 0.10 | 0.15 | 0.20 |
| 10—12th day | 0.05 | 0.07 | 0.15 | 0.25 |
| 12—18th day | 0.20 |  | 0.35 | 0.75 |
| Total loss: (in 18 days) | 5.60 | 3.67 | 5.15 | 5.75 |

In the above table, the figures are the average of at least three samples, and are figured on the weight of the discs after the 12 hours treatment described.

The attack of 10% HCl was also measured on flakes of the cement, which had a surface/mass ratio about four times greater than the discs (6 cm$^2$/g. instead of 1.7 cm$^2$/g). The erosion was not accelerated, which proves that the attack of the chemical is a volume effect.

The tensile strength was measured by the usual technique employed for tests of Portland cement, on 8-shaped pieces of 120 g. weight and 5 cm.$^2$ minimal cross section. In Table 2 the tensile strength of the cement in dependence upon its "age" is shown, and in Table 3 the same after various treatments. It can be observed that the strength increases with the "age" of the sample.

Table 2

| Days after preparation | Tensile strength |
|---|---|
|  | Kg./cm.$^2$ |
| 1 | 14.6 |
| 3 | 19.1 |
| 7 | 24.7 |
| 14 | 30.5 |
| 30 | 37.8 |
| 45 | 40.3 |

Table 3

| Treatment | Tensile strength in kg./cm.$^2$ | |
|---|---|---|
|  | Fresh sample | 30 days old sample |
| 2 days 10% HCl (at 100° C.) | 25.5 | 35.3 |
| 14 days 10% HCl (at 100° C.) |  | 38.5 |
| 2 days 25% H$_2$SO$_4$ (at 100° C.) |  | 37.5 |
| 1 day heating in air (at 120° C.) | 47.8 |  |

Finally it should be mentioned that the cement was also used as in practice e. g. as a bonding agent between acid-proof tiles of storage vessels and found to be faultless after prolonged use.

It will be understood that in the above examples, the amount of the diacetin used, is such as we have found to be entirely satisfactory. Amounts which are up to 10–12% more or less than these preferred quantities can be used, and fairly satisfactory products formed.

We claim:

1. In the production of an acid-resisting cement from waterglass, the step of adding to a soda waterglass having a specific gravity of about 1.35, a water-soluble fatty acid ester of a polyhydric alcohol selected from the group consisting of glycerol and glycol, which ester still contains at least one unesterified alcoholic hydroxyl group, in such amount as to react with about 80% to about 90% of the soda of the waterglass.

2. In the production of an acid-resisting cement from waterglass, the step of adding to a soda waterglass having a specific gravity of about 1.35, a water-soluble acetic acid ester of a polyhydric alcohol selected from the group consisting of glycerol and glycol, which ester still contains at least one unesterified alcoholic hydroxyl group, in such amount as to react with about 80% to about 90% of the soda of the waterglass.

3. In the production of an acid-resisting cement from waterglass, the step of adding to a soda waterglass having a specific gravity of about 1.35, an acetic acid ester of glycerol which ester still contains at least one unesterified alcoholic hydroxyl group in such amount as to react with about 80% to about 90% of the soda of the waterglass.

4. In the production of an acid-resisting cement from waterglass, the step of adding to a soda waterglass, having a specific gravity of about 1.35, glycerin diacetate in such amount as to react with about 80% to about 90% of the soda of the waterglass.

5. An acid-resisting cement which comprises an aqueous solution of an alkali metal silicate and glycerin diacetate, said substances being intimately admixed together and an inert solid filler incorporated with such mixture, said glycerin diacetate containing an amount of the acetate radical sufficient to neutralize a major fraction of the alkali in said silicate.

LADISLAW VILMOS FARKAS.
MICHAEL MOJZESC SZWARC.

REFERENCES CITED

The following references are of record in the file of this patent:

FOREIGN PATENTS

| Number | Country | Date |
|---|---|---|
| 106,452 | Austria | 1927 |
| 437,718 | Great Britain | 1934 |
| 766,346 | France | 1934 |
| 182,616 | Switzerland | 1936 |
| 551,408 | Great Britain | 1943 |